G. L. Crandal
Loom Shuttle.
Nº 70,171. Patented Oct. 29, 1867.
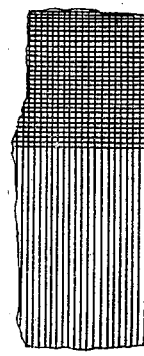
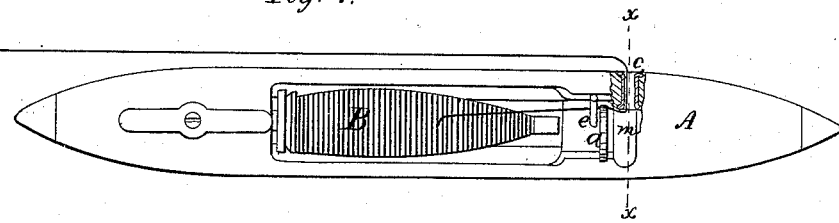
Fig: 1.
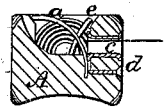
Fig: 2.
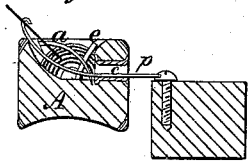
Fig: 4.
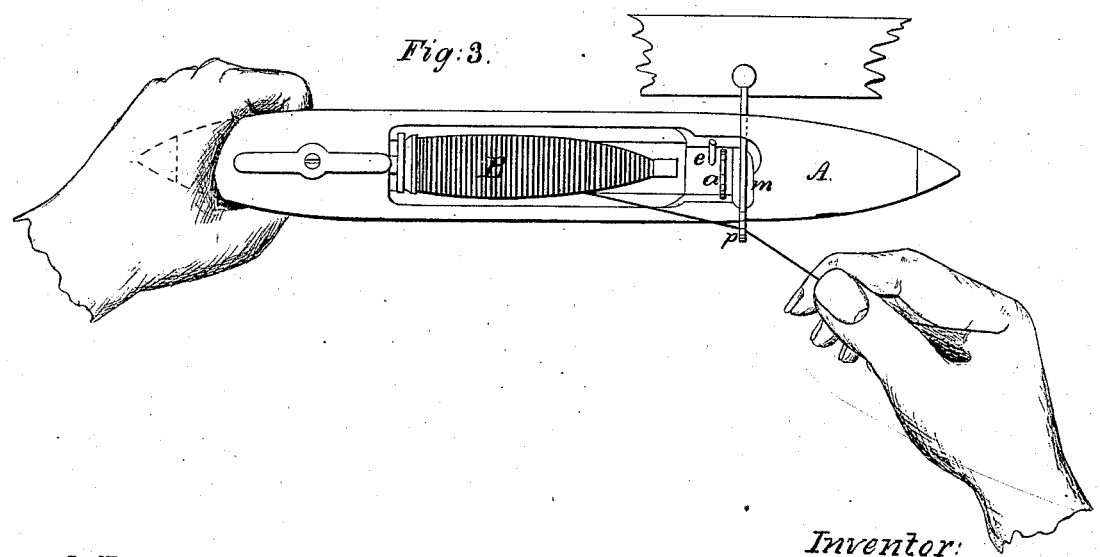
Fig: 3.
Witnesses:
Thos Tusche
Wm Trewin
Inventor:
G L Crandel
Per [signature]
Attorneys

United States Patent Office.

GEORGE L. CRANDAL, OF PITCHER, NEW YORK.

Letters Patent No. 70,171, dated October 29, 1867.

---

IMPROVEMENT IN SHUTTLES.

---

The Schedule referred to in these Letters Patent and making part of the same.

---

TO ALL WHOM IT MAY CONCERN:

Be it known that I, GEORGE L. CRANDAL, of Pitcher, in the county of Chenango, and State of New York, have invented new and useful Improvements in a Shuttle; and I do hereby declare that the following is a full, clear, and exact description thereof, which will enable others skilled in the art to make and use the same, reference being had to the accompanying drawings, forming part of this specification, in which—

Figure 1 is a view of the inside of a shuttle, showing my improved arrangement of an adjustable spring and wire for regulating the tension of the filling.

Figure 2 is a cross-section, taken in the line $x\ x$, fig. 1, showing the same device.

Figure 3 is an inside view of the shuttle, showing the provision made for and mode of using my improved spring threading-hook for threading the shuttle.

Figure 4 is a cross-section in the line $y\ y$, fig. 3, showing the same things.

Similar letters of reference indicate like parts.

This invention relates to devices attached to and connected with an ordinary weaving-shuttle for the purpose of regulating the filling during the operation of weaving, as it runs from the spool to the eye of the shuttle.

The tension improvement consists in placing an adjustable spring or wire loop on the inside near the eye of the shuttle, in connection with a stationary wire so formed that as the filling runs off of the spool to the eye, the tension, either loose or tight, as desired, will equalize the strain upon it, and take out the kinks to prevent their being woven into the cloth and making knots in it; and the threading arrangement consists in a curved channel or guide-way cut in the shell of the shuttle, on the inside, directly opposite the eye, for guiding an elastic or curved wire, having a hook on its end, which catches the filling and draws the end through the eye ready for weaving.

A represents an ordinary shuttle, containing a spool of filling, B. A strong bent spring, $a$, is fastened at one end to the shell on the inside of the shuttle, and on the opposite side to that in which the eye $c$ is located, and the free end curves over to the opposite side, near the eye, where it has room in a recess, $s$, to move, and is adjusted by a set-screw, $d$, fig. 2. A curved wire, $e$, is fastened rigidly near to the spring $a$ to form a narrow gate for the filling to pass through between them, and thus, by the position of the spring, receive more or less tension as it runs from the spool through the eye of the shuttle to the web in weaving, as shown clearly in fig. 1.

The position of this tension device requires a change in the mode of threading the shuttle, which I provide for by cutting a curved inclined groove, $m$, in the side of the shell, directly opposite the eye, for the purpose of guiding and turning up the end of an elastic or curved hook, $p$, that catches the filling and draws the end through the eye, as shown in fig. 3. The hook $p$ is to be screwed at one end to the breast-beam of the loom, in any convenient place on it, and by taking up the end of the shuttle with the left hand, and the end of the filling in the right hand, the stationary hook may be run through the eye to come out at the top of the shuttle and catch the end of the filling. This device is very convenient, and saves the weaver time and trouble.

What I claim as new, and desire to secure by Letters Patent, is—

1. The curved tension spring $a$, in combination with the curved fixed wire $e$, when arranged and operating in a shuttle substantially as and for the purpose herein specified.

2. The inclined groove $m$, in the shell of the shuttle, opposite the eye $c$, for guiding the threading-wire $p$, as set forth.

GEO. L. CRANDAL.

Witnesses:
E. W. ALLEN,
E. W. TERRILL.